Feb. 14, 1939.    L. H. CLARK ET AL    2,147,400
MANUFACTURE OF HYDROCARBON COMPOUNDS CONTAINING SULPHUR
Filed April 2, 1937
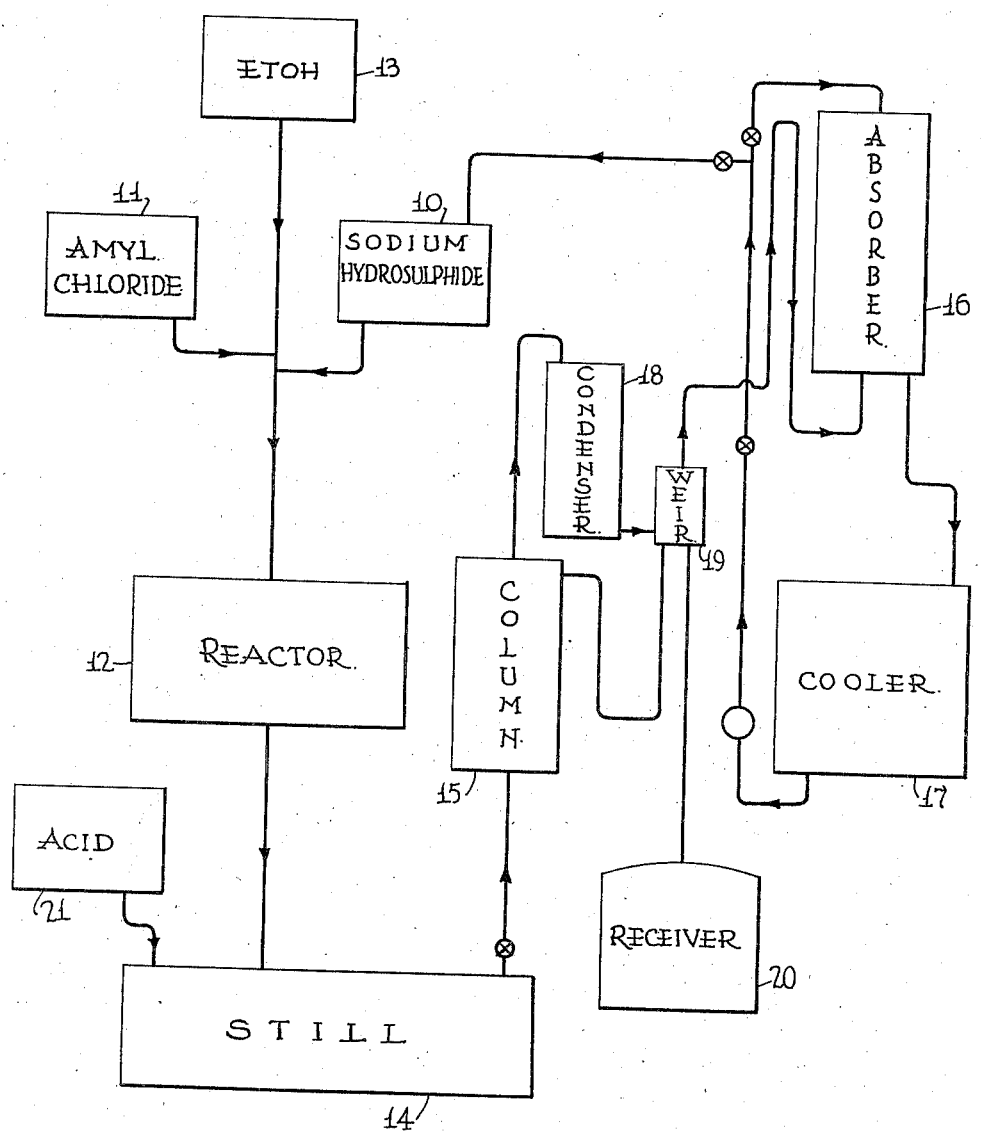
INVENTORS
LEE H. CLARK
CHARLES W. DEIBEL
BY Maurice A. Crewd
ATTORNEY.

Patented Feb. 14, 1939

2,147,400

UNITED STATES PATENT OFFICE 2,147,400

MANUFACTURE OF HYDROCARBON COMPOUNDS CONTAINING SULPHUR

Lee H. Clark, Grosse Ile, and Charles W. Deibel, Wyandotte, Mich., assignors to The Sharples Solvents Corporation, Philadelphia, Pa., a corporation of Delaware Application April 2, 1937, Serial No. 134,494

5 Claims. (Cl. 260—609).

The present invention pertains to the manufacture of hydrocarbon compounds containing sulphur, such, for example, as alkyl mercaptans and di-alkyl sulphides.

In a known method of producing alkyl mercaptans, sodium hydroxide may be first mixed with hydrogen sulphide to produce sodium hydrosulphide in accordance with the following equation:

1. $NaOH + H_2S \rightarrow NaHS + H_2O$
   Sodium hydrosulphide

The sodium hydrosulphide formed in accordance with Equation 1 is thereafter reacted with alkyl halide to produce the desired mercaptan. The principal reactions involved in this connection are as follows:

2. $RCl + NaHS \rightarrow RSH + NaCl$
   Alkyl mercaptan

3. $RSH + NaHS \rightarrow RSNa + H_2S$

4. $RSNa + RCl \rightarrow R_2S + NaCl$
   Di-alkyl sulphide

5. $C_5H_{11}SH \rightarrow C_5H_{10} + H_2S$

The present invention pertains to the manufacture of sulphides and mercaptans containing hydrocarbon radicals which may be hydroaromatic, or alkyl radicals, and involves the manufacture of such compounds by processes which may be represented by the above equations.

When reactions represented by the above equations occur, the materials resulting from the reactions naturally contain a certain amount of hydrogen sulphide, as indicated by Equation 3. The purpose of the present invention has been to recover this hydrogen sulphide and other compounds by a process which renders possible its reuse, thereby effecting economies in the practice of the process by improving the yields obtained and at the same time avoiding contamination of the surrounding atmosphere by the poisonous vapors of hydrogen sulphide.

The invention will be better understood by consideration of its application in the manufacture of a specific product and reference is therefore made to the attached flow sheet which illustrates the practice of the process of the invention in the manufacture of amyl mercaptan. Sodium hydrosulphide and amyl chloride from containers 10 and 11 are passed in equi-molecular proportions to a reactor 12, the sodium hydrosulphide being in the form of an aqueous solution of 40% or lower concentration. A quantity of ethyl alcohol approximately equal to one-half of the combined volumes of amyl chloride and sodium hydrosulphide is passed from the container 13 to the reactor and serves as a common solvent for the amyl chloride and sodium hydrosulphide to promote reaction. The materials in the reactor 12 are digested for a period of approximately three hours at a temperature between 140 and 150° C. to effect reaction between the amyl chloride and sodium hydrosulphide to produce amyl mercaptan in accordance with Equation 2 above, a pressure of 150–225 pounds per square inch being developed in connection with such digestion. At the conclusion of the reaction the materials are passed to a still 14 and subjected to steam distillation to remove hydrogen sulphide from the resultants of the reaction in the reactor 12. To this end the hydrogen sulphide, containing other impurities, is passed through column 15, condenser 18 and weir box 19 to an absorber 16, the condensable portion of the vapors passing from the still 14 being refluxed from condenser 18 through weir box 19 to column 15. The absorber 16 communicates with a cooler 17 which contains sodium hydroxide solution in approximately 25% concentration. Sodium hydroxide solution from the cooler 17 is circulated in counter-current direction with respect to hydrogen sulphide passing into the absorber 16, thus reacting with the hydrogen sulphide in accordance with Equation 1 above. The cooler maintains the circulating solution at a temperature between 20° and 30° C.

It is important that the sodium hydroxide solution be maintained at a temperature above 10° C. and not substantially above 30° C., for the materials must be maintained at a temperature sufficiently high to keep practically all of the sodium sulphide circulating in the absorber system in solution on the one hand, and they must be maintained sufficiently low to avoid distillation of amylene formed in accordance with Equation 5 on the other hand. If the temperature were not maintained sufficiently high to keep the sodium sulphide in solution, it would tend to plug the piping of the absorber system, and if the temperature were not maintained below the boiling point of amylene, amylene in the absorber system would be distilled from that system and carry with it substantial quantities of unreacted hydrogen sulphide. These two objectionable phenomena can best be avoided by maintaining the temperature of the circulating solution between 20 and 30° C. In order to accomplish this result, it is necessary to cool the recirculated sodium hydroxide continuously in the cooler 17, since the reaction between the sodium hydroxide and hydrogen sulphide is exothermic.

After removal of hydrogen sulphide from the still 14, the still residue is further purified by distillation. In this further distillation, alcohol, amyl chloride, amyl mercaptan and diamyl sulphide are passed through the column 15 under reflux, condensed in the condenser 18 and passed from the weir box 19 to receiver 20. The material remaining in the still 14 after removal of the alcohol and amyl chloride consists principally of unreacted sodium hydrosulphide. This material is preferably reacted with a small amount of acid from container 21 to produce further hydrogen sulphide in accordance with the following equation:

6. $NaHS + HCl \rightarrow NaCl + H_2S$

At the conclusion of this reaction, the material in the still is subjected to further distillation to remove additional hydrogen sulphide formed by the reaction with hydrochloric acid, and this additional hydrogen sulphide is reacted with sodium hydroxide circulated through the absorber system 16, 17, in the same way as the hydrogen sulphide formed in the initial reaction in the still 14.

After a sufficient quantity of hydrogen sulphide has been absorbed in the solution flowing in a countercurrent direction with respect to the hydrogen sulphide in the absorber 16 to convert substantially all of the sodium hydroxide contained in that solution to sodium hydrosulphide in accordance with Equation 1, this material is passed from the cooler 17 into the sodium hydrosulphide container 10 and thence passed to reactor 12 and reused in the performance of the process of the invention. Amyl mercaptan, amyl chloride and ethyl alcohol absorbed in the absorber 16 will likewise be returned to the reactor together with the sodium hydrosulphide solution.

While the invention has been described specifically with respect to the manufacture of amyl mercaptan, it will be understood that the feature of absorbing hydrogen sulphide passing from the process in a solution adapted to react with the hydrogen sulphide to produce a hydrosulphide reagent to be used in the subsequent performance of the process is a feature which is applicable to the manufacture of other mercapto or sulphide compounds, whether these compounds contain alkyl, aryl or hydroaromatic radicals attached to the sulphydryl radicals.

Modifications will be obvious to those skilled in the art. For example, other reagents capable of reacting with the hydrogen sulphide to produce a reagent which may be used in the original sulphydrolysis reaction, e. g., a base such as potassium hydroxide, may be substituted for the sodium hydroxide circulated in the absorber system 16, 17. Similarly, other acid reagents, for example, sulphuric acid, may be substituted for the hydrochloric acid employed in Equation 5. We do not therefore wish to be limited except by the scope of the subjoined claims.

We claim:
1. In a process of producing a sulphur derivative of pentane which comprises reacting amyl chloride with sodium hydrosulphide to effect a double decomposition reaction whereby the hydrosulphide radical of the sodium hydrosulphide is exchanged for the chlorine radical of the amyl chloride, the steps of distilling the reaction mixture to remove hydrogen sulphide together with some amylene therefrom, and absorbing the hydrogen sulphide from the distillate in a sodium hydroxide solution cooled to maintain it at a temperature between 10 and 30° C. during said absorption to produce a further quantity of sodium hydrosulphide.

2. In a process of producing a sulphur derivative of a paraffin hydrocarbon which comprises reacting an alkyl chloride with sodium hydrosulphide to effect a double decomposition reaction whereby the hydrosulphide radical of the sodium hydrosulphide is exchanged for the chlorine radical of the alkyl chloride, the steps of distilling the reaction mixture to remove hydrogen sulphide together with some olefin therefrom, and absorbing the hydrogen sulphide from the distillate in a sodium hydroxide solution cooled to maintain it at a temperature between 10° C. and the boiling point of said olefin during said absorption to produce a further quantity of sodium hydrosulphide.

3. In a process of producing a sulphur derivative of a paraffin hydrocarbon which comprises reacting an alkyl chloride with an alkali metal hydrosulphide to effect a double decomposition reaction whereby the hydrosulphide radical of the alkali metal hydrosulphide is exchanged for the chlorine radical of the alkyl chloride, the steps of distilling the reaction mixture to remove hydrogen sulphide together with some olefin therefrom, and absorbing the hydrogen sulfin from the distillate in an alkali metal hydroxide solution cooled to maintain it at a temperature between 10° C. and the boiling point of said olefin during said absorption to produce a further quantity of an alkali metal hydrosulphide.

4. In a process of producing a sulphur derivative of pentane which comprises reacting amyl chloride with an alkali metal hydrosulphide to effect a double decomposition reaction whereby the hydrosulphide radical of the alkali metal hydrosulphide is exchanged for the chlorine radical of the amyl chloride, the steps of distilling the reaction mixture to pass overhead hydrogen sulphide, olefin, amyl chloride and amyl mercaptan and leave a still residue consisting principally of an alkali metal hydrosulphide, reacting the residue containing alkali metal hydrosulphide with an acid to produce further hydrogen sulphide, and absorbing said further hydrogen sulphide in an alkali metal hydroxide solution cooled to maintain it at a temperature between 10 and 30° C. during said absorption to produce a further quantity of alkali metal hydrosulphide.

5. In a process of producing a sulphur derivative of a paraffin hydrocarbon which comprises reacting alkyl chloride with an alkali metal hydrosulphide to effect a double decomposition reaction whereby the hydrosulphide radical of the alkali metal hydrosulphide is exchanged for the chlorine radical of the alkyl chloride, the steps of distilling the reaction mixture to pass overhead hydrogen sulphide, olefin, alkyl chloride and alkyl mercaptan and leave a still residue consisting principally of an alkali metal hydrosulphide, reacting the residue containing alkali metal hydrosulphide with an acid to produce further hydrogen sulphide, and absorbing said further hydrogen sulphide in an alkali metal hydroxide solution cooled to maintain it at a temperature between 10 and 30° C. during said absorption to produce a further quantity of alkali metal hydrosulphide.

LEE H. CLARK.
CHARLES W. DEIBEL.